US006649111B2

(12) United States Patent
Hannewald et al.

(10) Patent No.: US 6,649,111 B2
(45) Date of Patent: Nov. 18, 2003

(54) METHOD FOR PRODUCING A HOUSING FOR A THROTTLE VALVE CONNECTION PIECE

(75) Inventors: Thomas Hannewald, Griesheim (DE); Armin Seeger, Bad Soden (DE); Rolf Oppermann, Schwalbach (DE); Michael Haede, Schotten (DE); Rüdiger Mörbe, Niedernhausen (DE); Carlos Backes, Eppstein (DE); Horst Schäfer, Sulzbach (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/838,666

(22) Filed: Apr. 18, 2001

(65) Prior Publication Data

US 2002/0023347 A1 Feb. 28, 2002

(30) Foreign Application Priority Data

May 12, 2000 (DE) ........................................ 100 23 348

(51) Int. Cl.$^{7}$ .......................... B29C 45/14; B29C 33/76

(52) U.S. Cl. ........................ 264/278; 264/259; 264/275

(58) Field of Search ................................ 249/178, 179; 425/577; 264/259, 271.1, 275, 266, 278

(56) References Cited

U.S. PATENT DOCUMENTS

| | | | | | |
|---|---|---|---|---|---|
| 2,160,108 | A | | 5/1939 | Reid | |
| 3,233,861 | A | * | 2/1966 | Stillwagon | 251/148 |
| 4,223,430 | A | * | 9/1980 | Sherlaw | 251/306 |
| 4,317,558 | A | | 3/1982 | Sherlaw | |
| 4,740,347 | A | * | 4/1988 | Sloan et al. | 264/262 |
| 5,402,983 | A | * | 4/1995 | Bernhardt | 251/214 |
| 5,421,718 | A | * | 6/1995 | Karlsson et al. | 249/96 |
| 5,615,861 | A | * | 4/1997 | Pollmann et al. | 123/403 |
| 5,794,591 | A | * | 8/1998 | Kalebjian et al. | 123/337 |
| 5,902,426 | A | * | 5/1999 | Daly | 156/242 |
| 5,965,077 | A | * | 10/1999 | Rowley et al. | 264/263 |
| 6,451,238 | B1 | * | 9/2002 | Suzuki et al. | 264/250 |

FOREIGN PATENT DOCUMENTS

| | | |
|---|---|---|
| DE | 1266480 | 4/1968 |
| DE | 2012740 | 10/1971 |
| DE | 4334180 | 4/1995 |
| DE | 69020567 | 11/1995 |
| FR | 2687601 | 8/1993 |
| FR | 2762374 | 10/1998 |
| WO | 9502493 | 1/1995 |
| WO | 9704259 | 2/1997 |

OTHER PUBLICATIONS

Patent Abstracts of Japan vol. 1997, No. 11, Nov. 28, 1997 & JP 09 195 803 A (Nissan Motor Co Ltd), Jul. 29, 1997.

(List continued on next page.)

*Primary Examiner*—Angela Ortiz
(74) *Attorney, Agent, or Firm*—Martin A. Farber

(57) ABSTRACT

The invention relates to a method for producing a housing (12) for a throttle valve connection piece (10), which housing is to have particularly high dimensional stability. For this purpose, the housing (12), which has a throttle orifice (16) for a throttle valve (20), is produced from plastic (14) by the injection molding method, plastic (14) being partially injected around a metal cylinder (28) which, at least in the region of the throttle valve (20), forms the throttle orifice (16). In this case, before the injection molding method, an expanding mandrel (50) is expanded against the inner face (33) of the metal cylinder (28). During the injection molding method, the inner face (33) of the metal cylinder (28) is supported at least partially by the expanding mandrel (50). After the injection molding method, a reduction in the outer circumference (80) of the expanding mandrel (50) is carried out in order to remove the expanding mandrel (50) from the interior (70) of the metal cylinder (28).

8 Claims, 4 Drawing Sheets

OTHER PUBLICATIONS

Patent Abstracts of Japan vol. 1997, No. 06, Jun. 30, 1997 & JP 09 049443 A (Denso Corp), Feb. 18, 1997.

Patent Abstracts of Japan vol. 08, Jun. 30, 1999 & JP 11 062637 A (Denso Corp), Mar. 5, 1999.

* cited by examiner

METHOD FOR PRODUCING A HOUSING FOR A THROTTLE VALVE CONNECTION PIECE

FIELD AND BACKGROUND OF THE INVENTION

The invention relates to a method for producing a housing for a throttle valve connection piece, which housing has a throttle orifice for a throttle valve, the housing being produced from plastic by the injection molding method, and, during the injection molding method, plastic being partially injected around a metal cylinder which, at least in the region of the throttle valve, forms the throttle orifice. The invention relates, furthermore, to a throttle valve connection piece with a housing which has a throttle orifice for a throttle valve, the housing produced from plastic by the injection molding method having a metal cylinder which is partially surrounded by plastic and, at least in the region of the throttle valve, forms the throttle orifice.

Throttle valve connection pieces are conventionally used for controlling the fresh-gas quantity of a motor vehicle. Throttle valve connection pieces comprise a housing with a throttle orifice and a throttle member arranged in the throttle orifice. The throttle member assumes a specific position in the throttle orifice for the passage of a specific fresh-gas quantity. For this purpose, the throttle member can be activated mechanically or electronically.

Housings of throttle valve connection pieces are usually produced from plastic or from metal. Those housings of throttle valve connection pieces which are manufactured from metal, for example aluminum, may have particularly low tolerances. Low tolerances are necessary for a throttle valve connection piece, in the region of the throttle valve, particularly when an especially accurate opening and closing of the throttle valve is required. In the closing region of the throttle valve, these requirements are also referred to as leakage-air requirements. However, metal housings of throttle valve connection pieces have the disadvantage that, after the housing has been produced, for example by the diecasting method, complicated remachining of the housing is necessary. It is often necessary, for example, to carry out careful remachining of the housing extensions provided for bearings of the throttle valve shaft, so that the bearings of the throttle valve shaft can be fitted into the housing without tilting.

Those housings of throttle valve connection pieces which are manufactured from plastic have a lower weight than those housings of throttle valve connection pieces which are manufactured essentially from metal, in particular aluminum. Furthermore, plastic, as material, can also be adapted in an especially simple way to a wide variety of geometric configurations of the housing. Moreover, in the case of plastic housings produced by the injection molding method, inserts, for example bearings for mounting the throttle valve shaft, can be injected into the housing.

However, those housings of throttle valve connection pieces which are produced from plastic by the injection molding method have the disadvantage that they shrink during and after the injection molding method. Moreover, housings of this type may experience warping after removal from the mold, that is to say may be deformed when they are taken out of the injection mold. Also, those housings of throttle valve connection pieces which are manufactured from plastic are not especially dimensionally stable over a particularly wide temperature range. On the one hand, in a motor vehicle, housings of throttle valve connection pieces are exposed to outside temperatures down to −40° C. On the other hand, when the throttle valve connection piece is in operation, the temperature of the throttle valve connection piece may rise above 100° C. These wide temperature fluctuations may lead to adverse deformations of the plastic in the pivoting region of the throttle valve. These deformations, in turn, may lead to the particularly high accuracy of fit of the throttle valve in the housing decreasing in the course of time. In this context, particularly high accuracy of fit means, for example, accuracies of fit of the housing of the throttle valve connection piece in the range of 0 to 30 $\mu$m, in so far as the housing is subject, for example, to the ISO tolerance with respect to the dimension for the throttle orifice. As a result of changes in shape of the throttle orifice, the particularly stringent leakage-air requirements, especially when the throttle valve is in the idling position, can no longer be satisfied. This entails an increased fuel consumption and a diminished exhaust-gas quality. For a constant fuel consumption and a constant exhaust-gas quality, therefore, it is necessary to have a dimensional stability of the housing of the throttle valve connection piece, in particular of the throttle orifice, over many years.

DE 43 34 180 A1 discloses a housing manufactured from plastic for a throttle valve connection piece, an annular insertion part being integrated into said housing in the pivoting region of the throttle valve. Although the insertion part, around which plastic is injected completely, improves dimensional stability of the housing of the throttle valve connection piece, it cannot reliably prevent changes in shape in the pivoting region of the throttle valve due to the high compressive loads during the injection of the plastic. Interaction of the medium passing through the throttle valve connection piece with the plastic leads, as before, to changes in shape of the plastic and therefore of the throttle orifice, even though these changes are no longer as drastic as would be the case without the annular insertion part.

SUMMARY OF THE INVENTION

The object on which the invention is based, therefore, is to specify a method for producing a housing for a throttle valve connection piece of the abovementioned type, in which the dimensional stability of the metal cylinder during the injection molding method and the dimensional stability of the housing after removal from the mold are ensured in an especially reliable way. Moreover, a throttle valve connection piece is to be specified, the housing of which has especially high dimensional stability even in the case of especially high temperature fluctuations.

With regard to the method, this object is achieved, according to the invention, in that, before the injection molding method, an expanding mandrel having a diameter which can be enlarged is expanded against the inner face of the metal cylinder. During the injection molding method the inner face if the metal is supported at least partially by the expanding mandrel, and, after the injection molding method, the outer circumference of the expanding mandrel is reduced in order to remove the expanding mandrel from the interior of the metal cylinder.

The invention proceeds from the notion that dimensional stability of the housing after removal from the mold is ensured particularly reliably when the housing has dimensionally stable elements in the region of the throttle orifice during the injection molding operation. A particularly simple design of a dimensionally stable element, at least for a part region of the throttle orifice, is a metal cylinder which is hollow on the inside. It must be remembered, in this case, however, that, during the injection molding method, even a metal cylinder must be protected against deformations which may occur due to the pressure built up by the plastic during the injection molding method. The problem arises here, however, that supporting bodies which support the metal cylinder during the injection molding method often leave behind scores or roundnesses in the metal cylinder during removal from the mold. Scores or roundnesses normally occur when the supporting body is moved out of the metal cylinder, particularly when the supporting body is released from the inner casing of the metal cylinder. The result of these scores or roundnesses may be that the housing of the throttle valve connection piece does not have, for example, a tolerance which is predetermined for the throttle orifice. These scores or roundnesses can be removed by means of a subsequent mechanical machining of the housing, which, however, proves highly time-intensive and markedly increases the outlay involved in producing the housing. A supporting body which supports the metal cylinder during the injection molding method does not leave behind any scores or roundnesses in the housing when the supporting body expands against the housing during the injection molding method and can be reduced in respect of its outer dimensions during removal from the mold. An expanding mandrel has this property of having larger dimensions during the injection molding method than during removal from the mold. In order to produce, for a throttle valve connection piece, a housing having virtually no scores and roundnesses, therefore, the expanding mandrel is pushed into the interior of the metal cylinder before the injection molding method and expanded against the inner casing of the metal cylinder. During removal from the mold, the outer circumference of the expanding mandrel is then first reduced, before the expanding mandrel is removed from the interior of the metal cylinder.

Advantageously, the expanding mandrel has an expanding device and an outer casing at least partially surrounding the expanding device. Before the injection molding method, the outer casing of the expanding mandrel is then expanded radially against the inner face of the metal cylinder by means of the expanding device. During the injection molding method, the outer casing of the expanding body is expanded radially against the inner face of the metal cylinder by means of the expanding device. After the injection molding method, a contraction of the outer casing of the expanding mandrel is carried out by means of the expanding device in order to remove the expanding mandrel from the interior of the metal cylinder. An expanding mandrel with an outer casing at least partially surrounding the expanding device can be expanded radially and contracted radially, with the result that the function of the expanding mandrel is ensured in an especially simple way by means of a particularly small number of elements. Expansion and contraction of the expanding device take place mechanically or hydraulically in this case.

During the injection molding method, the outer casing of the expanding mandrel is advantageously pressed at least partially over its area onto the inner face of the metal cylinder by the expanding device of the expanding mandrel. The outer casing of the expanding mandrel is therefore shaped in such a way that it can be expanded over its area onto the inner face of the metal cylinder by means of the expanding device, with the result that the expanding mandrel can exert a particularly homogeneous pressure on the inner face of the metal cylinder. Support of the metal cylinder is thereby ensured in a particularly reliable way, even when the throttle orifice has different shapes, scores and/or roundnesses caused by the outer casing of the expanding mandrel being reliably avoided. There is therefore no need for remachining of the metal cylinder after the injection molding method, with the result that the outlay in terms of the production of the housing of the throttle valve connection piece is particularly low. If in this case, for example, the expanding mandrel has an oval contour, the metal cylinder can have generated on it an intentional nonroundness which is compensated by the shrinkage of the plastic during solidification. At the same time, by means of the mechanical or hydraulic expanding device, an approximately homogeneous pressure of the outer casing of the expanding mandrel is exerted on the inner face of the metal cylinder.

Advantageously, the expanding device has an axle, a securing means and a supporting body, the supporting body being movable along the axle, having an approximately rotationally symmetric shape, tapering along the axle and having a first end region with a smaller diameter and a second end region with a larger diameter. Before the injection molding method, in order to expand the outer casing of the expanding mandrel against the inner face of the metal cylinder, the supporting body is moved, with its first end region, having a smaller diameter, along the axle into the interior of the metal cylinder. During the injection molding method, the supporting body is fixed on the axle by the securing means. After the injection molding method, in order to remove the supporting body from the interior of the metal cylinder, a contraction of the outer casing of the expanding mandrel is carried out by means of a movement of the supporting body along the axle out of the interior of the metal cylinder. Due to the shape and movability of the supporting body, the expanding device and consequently the expanding mandrel can be adapted in an especially simple way to different heights of the metal cylinder. Moreover, the movement of the tapering supporting body proves to be sufficient to expand the expanding mandrel against the inner face of the metal cylinder in the interior of said metal cylinder.

The supporting body of the expanding device is advantageously designed approximately in the form of a cone. A cone can be produced particularly simply, and, in the case of the cone, said cone can be adapted especially simply to different diameters and different shapes of the throttle orifice by means of the inclination of the outer face relative to the base.

The axle advantageously has a thread, onto which the securing means is screwed in order to fix the supporting body. When the securing means is designed, for example, as a nut to be screwed onto a thread, the pressure to be exerted on the outer casing of the expanding mandrel can be set in particularly fine steps by means of a specific number of turns of the nut on the thread.

Advantageously, the supporting device has, in addition to the first supporting body, a second supporting body which is fixedly connected axially to the axle, has an approximately rotationally symmetric shape, tapers along the axle and has a first end region with a smaller diameter and a second end region with, in comparison with this, a larger diameter. Before the injection molding method, in order to expand the outer casing of the expanding mandrel against the inner face of the metal cylinder, the first end region, having a smaller diameter, of the first supporting body is then moved into the interior of the metal cylinder in the direction of the first end region, having a smaller diameter, of the second supporting body. During the injection molding method, the first supporting body is then fixed on the axle by the securing means. After the injection molding method, in order to remove the expanding mandrel from the interior of the metal cylinder, a contraction of the outer casing of the expanding mandrel is carried out by means of a movement of the first end region, having a smaller diameter, of the first supporting body along the axle, away from the first end region, having a smaller diameter, of the second supporting body, out of the interior of the metal cylinder. In this case, advantageously, the second supporting body is designed approximately in the form of a cone. A first and a second supporting body of the expanding device can be adapted in an especially simple way to different axle lengths of the outer casing of the expanding device and therefore to different axle lengths of the metal cylinder. Moreover, due to the tapering shape both of the first and of the second supporting body, the pressure which the two supporting bodies exert jointly on the outer casing of the expanding mandrel can be set especially simply. In particular, by means of two approximately conical supporting bodies, a particularly homogeneous pressure can be exerted on the inner face of the metal cylinder by means of an approximately cylindrical outer casing of the expanding device. In this case, the first supporting body and the second supporting body may either have the same cone-like shape or else have different outer contours of their approximately conical configuration.

As regards the throttle valve connection piece, the object is achieved, according to the invention, in that, in order to seal off the housing together with the metal cylinder, the metal cylinder tapers toward one or toward both of its end regions. By virtue of this refinement, the metal cylinder forming the throttle orifice at least in the region of the throttle valve can be adapted particularly well, by expansion after the injection molding method, to the remaining throttle orifice housing wall formed from plastic. This applies, in particular, when there is provision for shrinkage of the plastic in the end regions of the metal cylinder. A virtually continuous transition from the metal cylinder to the plastic of the housing is thereby ensured in the throttle orifice. When the throttle valve connection piece is in operation, a particularly smooth surface with virtually no unevennesses ensures an especially turbulence-free flow of the medium passing through the throttle orifice, with the result that a particularly high flow velocity of the medium can be achieved. A particularly high flow velocity of the medium passing through the throttle orifice when the throttle valve connection piece is in operation ensures, in turn, particularly fine regulatability of the mass flow passing through the throttle orifice.

Advantageously, the metal cylinder has extensions which project radially from its outer lateral surface and which are advantageously provided for bearings of the throttle valve shaft. These receptacles ensure in a particularly reliable way a centric fit of the throttle valve shaft in the metal cylinder. Moreover, the final mounting of the throttle valve connection piece becomes especially simple as a result, since additional receptacles for the bearings do not have to be fitted into the housing. Furthermore, the integration of the extensions into the metal cylinder reduces the elements necessary for the housing of the throttle valve connection piece, with the result that the outlay in terms of the production of the housing of the throttle valve connection piece is particularly low.

In order in an especially advantageous way to enhance the lightweight construction of the housing of the throttle valve connection piece achieved by means of the plastic, the metal cylinder is advantageously manufactured from aluminum. The housing of the throttle valve connection piece thereby has a particularly low weight.

Advantageously, the housing of the throttle valve connection piece is produced in one piece with the drive housing of the throttle valve connection piece. By virtue of this form of construction, the outlay in terms of production and assembly which is necessary for the throttle valve connection piece is particularly low.

The advantages achieved by means of the invention are, in particular, that the lightweight construction of the housing is associated with an especially high dimensional stability of the housing. At the same time, during the injection molding method, a deformation of the metal cylinder is reliably avoided by means of the expanding mandrel. During removal from the mold, the expanding mandrel is first contracted, before it is taken out of the interior of the metal cylinder. By the expanding mandrel being used, scores and/or roundnesses of the metal cylinder due to the production process are avoided in a particularly reliable way. Moreover, this production method ensures especially reliably a particularly cost-effective production of a housing for a throttle valve connection piece, this production involving a particularly low outlay in technical terms. Furthermore, a throttle valve connection piece with a metal cylinder tapering toward its end regions has an especially smooth surface of the throttle orifice, thus ensuring especially reliably a particularly turbulence-free flow of the medium passing through the throttle orifice.

BRIEF DESCRIPTION OF THE DRAWINGS

An exemplary embodiment of the invention is explained in more detail with reference to a drawing in which.

Parts corresponding to one another are given the same symbols in all the figures.

DETAILED DESCRIPTION OF THE PREFERRED EMBODIMENT

Figure 1:
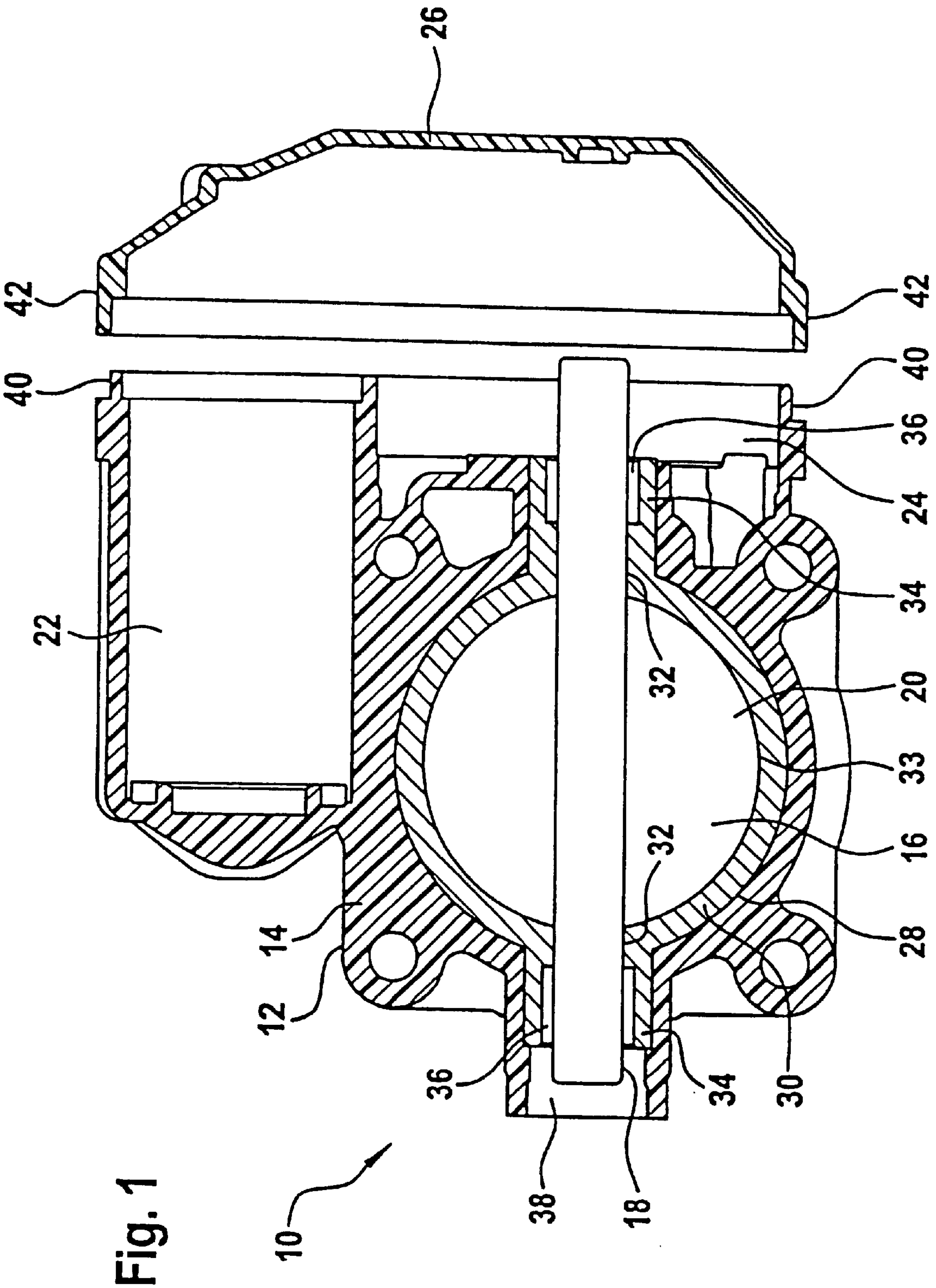
FIG. 1 shows diagrammatically a top view of a housing of a throttle valve connection piece.

The throttle valve connection piece 10 according to FIG. 1 serves for supplying an air mixture or a fuel/air mixture to a consumer, not illustrated, for example an injection device of a motor vehicle, likewise not illustrated, the fresh-gas quantity to be supplied to the consumer being capable of being controlled by means of the throttle valve connection piece 10. For this purpose, the throttle valve connection piece 10 has a housing 12 which has been manufactured predominantly from plastic 14 and which has been produced by the injection molding method. The housing 12 has a throttle orifice 16, via which an air mixture or a fuel/air mixture can be supplied to the consumer, not illustrated. In order to set the volume of fresh gas to be supplied, a throttle valve 20 is arranged on a throttle valve shaft 18. Rotation of the throttle valve shaft 18 simultaneously causes pivoting of the throttle valve 20 arranged on the throttle valve shaft 18, with the result that the cross section of the throttle orifice 16 is increased or reduced. By means of an increase or reduction in the cross section of the throttle orifice 16 by means of the throttle valve 20, a regulation of the throughput of the air mixture or fuel/air mixture through the throttle orifice 16 of the throttle valve connection piece 10 is carried out.

The throttle valve shaft 18 may be connected to a pulley, not illustrated in any more detail, which, in turn, is connected via a Bowden cable to a setting device for a power requirement. The setting device may, in this case, be designed as the accelerator pedal of a motor vehicle, so that, by an actuation of this setting device by the driver of the motor vehicle, the throttle valve 20 can be brought from a position of minimum opening, in particular a closing position, into a position of maximum opening, in particular an open position, in order thereby to control the power output of the motor vehicle.

In contrast to this, the throttle valve shaft 18, shown in FIG. 1, of the throttle valve connection piece 10 either can be set in a part range by an actuating drive and otherwise via the accelerator pedal or else the throttle valve 20 can be set over the entire adjustment range by an actuating drive. In these so-called E-gas or drive-by-wire systems, the mechanical power control, for example the depression of an accelerator pedal, is converted into an electrical signal. This signal, in turn, is supplied to a control unit which generates an activating signal for the actuating drive. In these systems, during normal operation, there is no mechanical coupling between the accelerator pedal and the throttle valve 20.

In order to adjust the throttle valve shaft 18 and consequently the throttle valve 20, therefore, the throttle valve connection piece 10 has a drive housing 22 and a gear housing 24. The drive housing 22 and the gear housing 24 are produced in one piece with the housing 12 of the throttle valve connection piece 10, but they may also together form a separate one-piece structural unit or else each be produced separately in one piece. An electric motor designed as an actuating drive is arranged in the drive housing 22. Both the drive housing 22 and the gear housing 24 are capable of being closed by a cover 26.

The electric motor moves the throttle valve shaft 18 via a reduction gear arranged in the gear housing 24. The electric motor thus pivots the throttle valve shaft 18 via the reduction gear. The electric motor and the reduction gear are not illustrated in the drawing. The electric motor is activated via a control unit which is likewise not illustrated in the drawing. The control unit transmits to the electric motor a signal, by means of which the electric motor brings about a specific position of the throttle valve shaft 18 via the reduction gear. The actual position of the throttle valve shaft 18 can be detected by means of a corresponding sensor. A potentiometer, in which the potentiometer slide is connected to the throttle valve shaft 18, is particularly suitable for this purpose. This sensor, too, is not illustrated in the drawing.

Furthermore, according to FIG. 1, the throttle valve connection piece 10 comprises a metal cylinder 28 which is manufactured from aluminum 30 and has been injected into the plastic 14 in the region of the throttle orifice 16 during the injection molding method. The metal cylinder 28 is in its simplest form a piece of tubing which has leadthroughs 32 for the throttle valve shaft 18. The inner face 33 of the metal cylinder 28 is made smooth. However, the inner face 33 of the metal cylinder 28 may also be worked in a contoured manner, so as to ensure predetermined characteristic curves for the volume throughput through the throttle orifice 16 as a function of the position of the throttle valve 20.

According to FIG. 1, the metal cylinder 28 has an extension 34 in the region of each of the two leadthroughs 32. These two extensions 34 are provided for receiving bearings 36 for the throttle valve shaft 18. The housing 12 of the throttle valve connection piece 10 thereby proves to be particularly easy to assemble, since, after the production of the housing 12, the bearings 36 then merely have to be inserted into the extensions provided for this purpose.

The throttle valve shaft 18 terminates on one side, on the left side according to FIG. 1, in a space 38, in which, for example, so-called return springs and/or emergency running springs can be accommodated. The return springs and/or emergency running springs cause the throttle valve shaft 18 to be prestressed in the closing direction, so that the electric motor operates counter to the force of the return springs and/or emergency running springs. A so-called emergency running spring, if the electric motor fails, causes the throttle valve 20 to be brought into a defined position which is normally above the idling speed. Alternatively or additionally, the throttle valve shaft 18 may also project beyond the space 38 out of the housing 12 of the throttle valve connection piece 10. It is then possible, for example, to mount on the end of the throttle valve shaft 18 a pulley, not illustrated in the drawing, which is connected to an accelerator pedal via a Bowden cable, as a result of which a mechanical desired-value presetting is implemented. This mechanical coupling of the throttle valve shaft 18 to the accelerator pedal, not illustrated in any more detail in the drawing, can ensure that the throttle valve connection piece 10 operates in emergency situations, for example if the actuating drive fails. That end of the space 38 which faces away from the end of the extension 34 may be used for receiving further elements, such as, for example, a potentiometer for detecting the current position of the throttle valve shaft 18. Furthermore, the end face of the extensions 34 may have arranged on it further attachments which are provided for receiving additional elements, such as, for example, plug-fitting shafts for gearwheels or toothed quadrants of the gear, which is not shown.

The housing 12 of the throttle valve connection piece 10 has, in the direction of the cover 26, a peripheral flattening 40 which matches a peripheral web 42 of the cover 26. The flattening 40 and the web 42 ensure a defined position of the cover 26 on the housing 12. The two mutually confronting faces of the flattening 40 and of the web 42 are fused with one another via a laser beam after the cover 26 has been placed on the housing 12, with the result that a virtually unreleasable connection is obtained.

Figure 2:
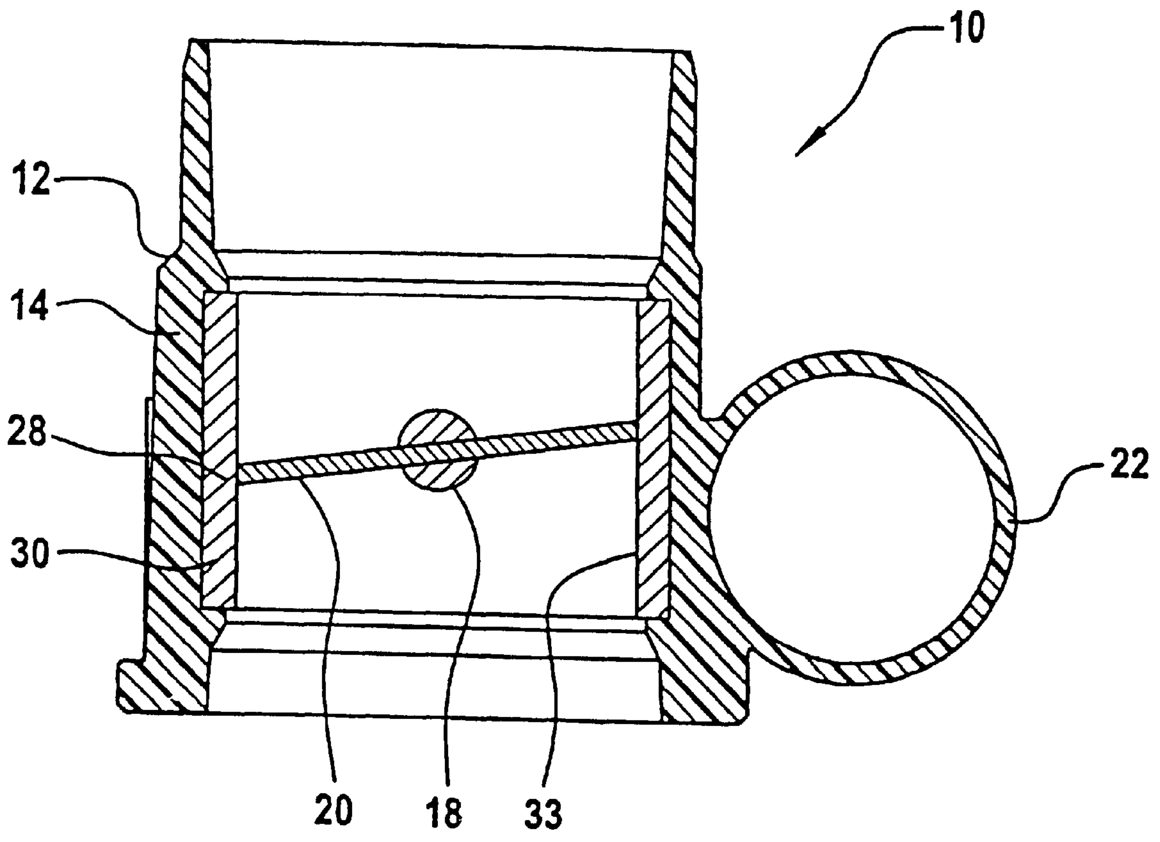
FIG. 2 shows diagrammatically a first longitudinal section through a housing of a throttle valve connection piece.

FIG. 2 shows a first embodiment of the throttle valve connection piece 10 according to FIG. 1 diagrammatically in longitudinal section. According to FIG. 2, the metal cylinder 28 is designed as a simple hollow cylinder and is manufactured from aluminum 30. The outer circumference of the metal cylinder 28 and at least part of its end faces are surrounded by the plastic 14 of the housing 12. The inward inner face 33 of the metal cylinder 28 is designed as a smooth face. The throttle valve 20 is mounted pivotably in the housing 12 in the region of the metal cylinder 28 by means of the throttle valve shaft 18. The drive housing 22 is produced in one piece with the housing 12 of the throttle valve connection piece 10.

Figure 3:
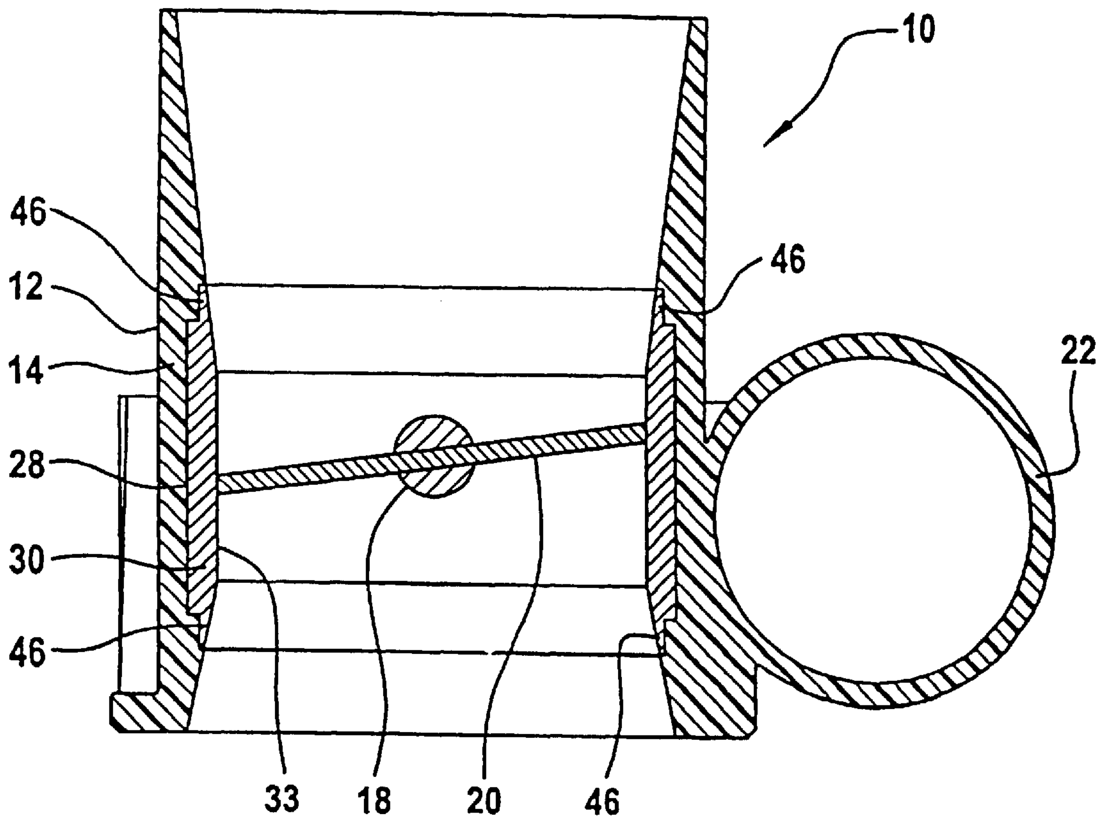
FIG. 3 shows diagrammatically a second longitudinal section through a housing of a throttle valve connection piece.

FIG. 3 shows a second embodiment of the throttle valve connection piece 10 according to FIG. 1 diagrammatically in longitudinal section. According to FIG. 3, the metal cylinder 28 is manufactured from aluminum 30 and is designed as a hollow cylinder which tapers toward its end regions 46. By the metal cylinder 28 tapering toward its end regions 46, the metal cylinder 28 can be expanded after the production of the housing 12 and pressed against the plastic. The metal cylinder 28 is thereby sealed off relative to the plastic 14, and at the same time a particularly continuous transition between the metal cylinder 28 and the plastic 14 of the housing 12 is achieved. When the throttle valve connection piece 10 is in operation, a particularly continuous transition between the metal cylinder 28 and the plastic 14 of the housing 12 ensures an especially turbulence-free flow of the medium passing through the throttle orifice 16. An especially turbulence-free flow of the medium passing through the throttle orifice 16 of the throttle valve connection piece 10 ensures, in turn, an especially fine regulatability of the volume flow passing through the throttle orifice 16 by means of the throttle valve 20. In this second embodiment of the housing 12 of the throttle valve connection piece 10, too, the drive housing 22 is produced in one piece with the housing 12 of the throttle valve connection piece 10. In this embodiment, too, the inner face 33 of the metal cylinder 28 is made smooth, but alternatively the inner face 33 of the metal cylinder 28 may also have contours, in order to ensure a specific throughput characteristic of the medium passing through the throttle orifice 16 of the throttle valve connection piece 10.

The housing 12 of the throttle valve connection piece 10 is produced from plastic 14 by the injection molding method. In this case, the metal cylinder 28 is laid into an injection mold and has plastic 14 partially injected around it. In order to ensure a particularly high dimensional stability of the metal cylinder 28 during the production of the housing 12, the metal cylinder 28 is supported by an expanding mandrel 50 according to FIG. 4 during the injection molding method.

Figure 4:
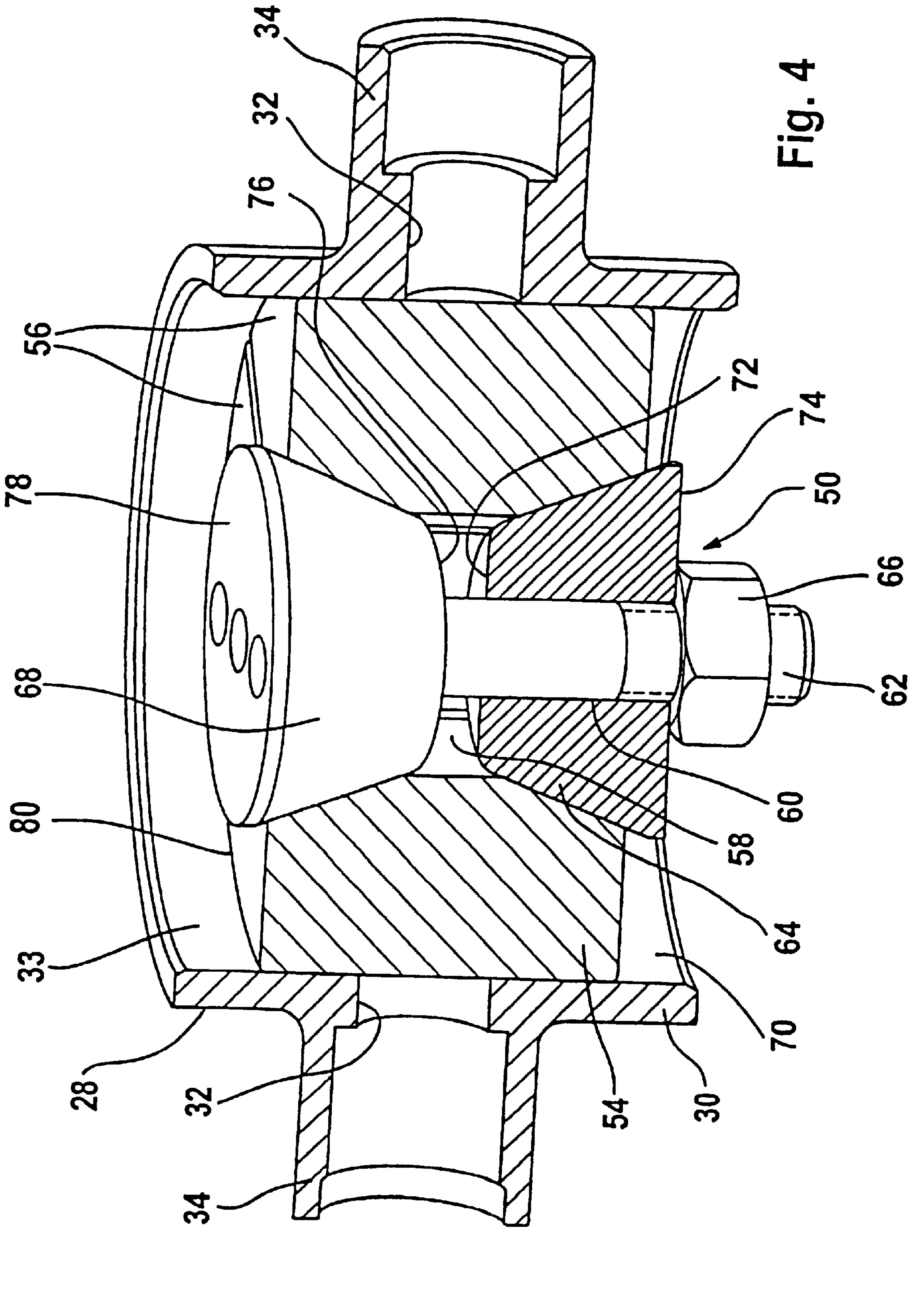
FIG. 4 shows diagrammatically an expanding mandrel which supports a metal cylinder.

The expanding mandrel 50 according to FIG. 4 is inserted into a metal cylinder 28 according to FIG. 2. Alternatively, however, the expanding mandrel according to FIG. 4 may also be inserted into a metal cylinder 28 according to FIG. 3. In the illustration of the metal cylinder 28 according to FIG. 4, the leadthroughs 32 for the throttle valve shaft 18 and the extensions 34 for the bearings 36 of the throttle valve shaft 18 can be seen.

The expanding mandrel 50 has an approximately annular outer casing 54 which is formed from individual part-annular pieces 56. The part-annular pieces 56 of the outer casing 54 are capable of being expanded against the inner face 33 of the metal cylinder 28 by means of an expanding device 58. The outer casing 54 of the expanding mandrel 50 has approximately the shape of a thick-walled hollow cylinder. Alternatively, however, the expanding mandrel 50 may also have an outer casing 54 with an oval contour. An intentional nonroundness can thereby be generated on the metal cylinder 28 due to the pressure exerted on the metal cylinder 28 during the injection molding method and is compensated again as a result of a shrinkage of the plastic 14 during cooling and/or solidification. An oval contour of the outer casing 54 of the expanding mandrel 50 is not illustrated in FIG. 4.

The expanding device 58 has an axle 60 which is provided partially with a thread 62. Alternatively, however, the axle 60 may also have a thread 62 over the entire region of its extent. In the region of the thread 62, the axle 60 has arranged on it a first supporting body 64 which can be secured on the axle 60 by a securing means 66 designed as a mechanical nut. The axle 60 has, on the side facing away from the first supporting body 64, a second supporting body 68 which is connected fixedly in terms of rotation to the axle 60. Both the first supporting body 64 and the second supporting body 68 have an approximately rotationally symmetric shape which tapers along the axle 60. At the same time, the first supporting body 64 and the second supporting body 68 have the same approximately cone-like shape. Alternatively, however, the first supporting body 64 and the second supporting body 68 may also have different outer contours.

Before the injection molding method provided for producing the housing 12, the expanding mandrel 50 is inserted into the interior 70 of the metal cylinder 28. In this case, the expanding mandrel 50 does not cover the entire inner face 33 of the metal cylinder 28. Alternatively, however, this may also be the case. Before the expanding mandrel 50 is arranged in the interior 70 of the metal cylinder 28, the securing means 66 and the first supporting body 64 are released from the axle 60 or at least displaced into the end region of the axle 60. The expanding mandrel 50 is then pushed into the interior 70 of the metal cylinder 28, until said expanding mandrel assumes a specific position. Then, in order to expand the outer casing 54 of the expanding mandrel 50 against the inner face 33 of the metal cylinder 28, the first supporting body 64 is moved with the aid of the securing means 66 along the axle 60 in the direction of the second supporting body 68 connected rigidly to the axle 60.

At the same time, the first end region 72, having a smaller diameter, of the first supporting body 64 moves toward the second supporting body 68 and the second end region 74, having, in comparison with this, a larger diameter, of the first supporting body 64 comes into contact with the securing means 66 designed as a nut. In this case, the first end region 72 having a smaller diameter has facing it the first end region 76, having a smaller diameter, of the second supporting body 68, and has facing away from it the second end region 78, having, in comparison with this, a larger diameter, of the second supporting body 68. The first supporting body 64 and the second supporting body 68 are, in this case, arranged in the part-annular pieces 56 of the outer casing 54 in such a way that both the second end region 74, having a larger diameter, of the first supporting body 64 and the second end region 78, having a larger diameter, of the second supporting body 68 in each case project beyond the part-annular pieces 56 of the outer casing 54.

Due to the approximately conical design of the first supporting body 64 and of the second supporting body 68, with the first supporting body 64 increasingly approaching the second supporting body 68, the part-annular pieces 56 of the outer casing 54 of the expanding mandrel 50 expand against the inner face 33 of the metal cylinder 28. At the same time, both the first supporting body 64 and the second supporting body 68 move into the interior 70 of the metal cylinder 28. The second end region 74, having a larger diameter, of the first supporting body 64 and the second end region 78, having a larger diameter, of the second supporting body 68 are, in this case, dimensioned such that neither the first supporting body 64 nor the second supporting body 68 can penetrate into the outer casing 54. The securing means 66 is, in this case, rotated until the outer casing 54 of the expanding mandrel 50 is expanded firmly against the inner face 33 of the metal cylinder 28 by means of the expanding device 58.

When plastic 14 is being injected around the metal cylinder 28, the expanding mandrel 50 supports the metal cylinder 28 against the pressure exerted on the metal cylinder 28 by the liquid plastic 14. In this case, the first supporting body 64 is secured on the axle 60. Indirectly, by the first supporting body 64 being secured on the axle 60, the second supporting body 68 is also fixed in the interior 70 of the metal cylinder 28. The counterpressure exerted on the metal cylinder 28 by the expanding mandrel 50 ensures dimensional stability of the metal cylinder 28 during the injection molding method in a particularly reliable way. When the housing 12 is removed from the mold, the securing means 66 designed as a nut, and consequently the first supporting body 64 and the second supporting body 68, are released. Subsequently, both the first supporting body 64 and the second supporting body 68 are moved out of the interior 70 of the metal cylinder 28. During this movement, because of the cone-like shape of the first supporting body 64 and of the second supporting body 68, the outer casing 54 of the expanding mandrel 50 is contracted. Contraction of the expanding device 58 causes a reduction in the outer circumference 80 of the outer casing 54 of the expanding mandrel 50, with the result that the outer casing 54 can be taken out of the housing 12. At the same time, due to the contraction of the expanding mandrel 50 by means of the expanding device 58, the expanding mandrel 50 can be removed from the metal cylinder 28, without leaving behind scores and/or roundnesses in the metal cylinder 28.

During the production of the housing 12, the expanding mandrel 50, which is to be inserted into the metal cylinder 28 while the housing 12 is being produced, brings about an especially high dimensional stability of the metal cylinder 28. Moreover, when the housing 12 is being removed from the mold, the expanding mandrel 50 is to be removed from the housing 12 by contraction, so that said expanding mandrel does not leave any scores and/or roundnesses behind in the housing 12. In addition, the metal cylinder 28 manufactured from aluminum 30 makes it possible to have a lightweight construction for the housing 12 of the throttle valve connection piece 10 in association with a particularly high dimensional stability of the housing 12 when the throttle valve connection piece 10 is in operation. A housing 12 made of plastic 14 for a throttle valve connection piece 10 is more economical to produce, since the reworking necessary for a metal housing is dispensed with. A plastic housing can also be adapted more simply to predeterminable shapes.

What is claimed is:

1. A method for producing a housing (12) for a throttle valve (10), which housing (12) has a throttle orifice (16) for a throttle valve (20), the housing (12) being produced from plastic (14) by an injection molding method, and, during the injection molding method, the plastic (14) being partially injected around a metal cylinder (28) whereby said metal cylinder provides dimensional stability and which, at least in a region of the throttle valve (20), an inner face of said metal cylinder forms the throttle orifice (16), wherein, before the injection molding method, an expanding mandrel (50) is expanded against the inner face (33) of the metal cylinder (28), during the injection molding method the inner face (33) of the metal cylinder (28) is supported at least partially by the expanding mandrel (50), and, after the injection molding method, an outer circumference (80) of the expanding mandrel (50) is reduced to remove the expanding mandrel (50) from an interior (70) of the metal cylinder (28).

2. The method for producing a housing (12) for a throttle valve (10) as claimed in claim 1, wherein the expanding mandrel (50) has an expanding device (58) and an outer casing (54) at least partially surrounding an expanding device (58), before the injection molding method the outer casing (54) of the expanding mandrel (50) being expanded radially against the inner face (33) of the metal cylinder (28) by the expanding device (58), during the injection molding method the outer casing (54) of the expanding mandrel (50) being expanded radially against the inner face (33) of the metal cylinder (28) by the expanding device (58) and, after the injection molding method, radial contraction of the outer casing (54) of the expanding mandrel (50) being carried out by the expanding device (58) to remove the expanding mandrel (50) from the interior (70) of the metal cylinder (28).

3. The method for producing a housing (12) for a throttle valve (10) as claimed in claim 2, wherein, during the injection molding method, the outer casing (54) of the expanding mandrel (50) is pressed at least partially over an area of the outer casing onto the inner face (33) of the metal cylinder (28) by the expanding device (58) of the expanding mandrel (50).

4. A method for producing a housing (12) for a throttle valve (10), which housing (12) has a throttle orifice (16) for a throttle valve (20), the housing (12) being produced from plastic (14) by an injection molding method, and, during the injection molding method, plastic (14) being partially injected around a metal cylinder (28) which, at least in a region of the throttle valve (20), forms the throttle orifice (16), wherein, before the injection molding method, an expanding mandrel (50) is expanded against an inner face (33) of the metal cylinder (28), during the injection molding method the inner face (33) of the metal cylinder (28) is supported at least partially by the expanding mandrel (50), and, after the injection molding method, an outer circumference (80) of the expanding mandrel (50) is reduced to remove the expanding mandrel (50) from an interior (70) of the metal cylinder (28), wherein the expanding mandrel (50) has an expanding device (58) and an outer casing (54) at least partially surrounding an expanding device (58), before the injection molding method the outer casing (54) of the expanding mandrel (50) being expanded radially against the inner face (33) of the metal cylinder (28) by the expanding device (58), during the injection molding method the outer casing (54) of the expanding mandrel (50) being expanded radially against the inner face (33) of the metal cylinder (28) by the expanding device (58), and, after the injection molding method, radial contraction of the outer casing (54) of the expanding mandrel (50) being carried out by the expanding device (58) to remove the expanding mandrel (50) from the interior (70) of the metal cylinder (28), wherein the expanding device (58) has an axle (60), a securing means (66) and a supporting body (64), the supporting body (64) being movable along the axle (60), having an approximately rotationally symmetric shape, tapering along the axle (60) and having a first end region (72) with a smaller diameter and a second end region (74) with a larger diameter relative to the first end region (72), before the injection molding method, in order to expand the outer casing (54) of the expanding mandrel (50) against the inner face (33) of the metal cylinder (28), the supporting body (64) being moved, with the first end region (72) of the supporting body (64) having a smaller diameter, along the axle (60) into the interior (70) of the metal cylinder (28), during the injection molding method the supporting body (64) being fixed on the axle (60) by the securing means (66), and, after the injection molding method, in order to remove the expanding mandrel (50) from the interior (70) of the metal cylinder (28), a contraction of the outer casing (54) of the expanding mandrel (50) being carried out by means of a movement of the supporting body (64) along the axle (60) out of the interior (70) of the metal cylinder (28).

5. The method for producing a housing (12) for a throttle valve (10) as claimed in claim 4 wherein the supporting body (64) is shaped approximately in the form of a cone.

6. The method for producing a housing (12) for a throttle valve (10) as claimed in claim 4, wherein the axle (60) has a thread (62), and wherein the securing means (66) is screwed onto said thread (62) to fix the first supporting body (64) on the axle (60).

7. The method for producing a housing (12) for a throttle valve (10) as claimed in claim 4, wherein the expanding device (58) has a second supporting body (68), said second supporting body (68) which is fixedly connected axially to the axle (60) has an approximately rotationally symmetric shape, tapers along the axle (60) and has a first end region (76) with a smaller diameter and a second end region (78) with a larger diameter relative to the first end region (76) before the injection molding method, in order to expand the outer casing (54) of the expanding mandrel (50) against the inner face (33) of the metal cylinder (28), the first end region (72), having a smaller diameter, of the first supporting body (64) being moved along the axle (60) into the interior (70) of the metal cylinder (28) in a direction of the first end region (76), having a smaller diameter, of the second supporting body (68), during the injection molding method the first supporting body (64) being fixed on the axle (60) by the securing means (66), and, after the injection molding method, in order to remove the expanding mandrel (50) from the interior (70) of the metal cylinder (28), a contraction of the outer casing (54) of the expanding mandrel (50) being carried out by means of a movement of the first end region (72), having the smaller diameter, of the first supporting body (64) along the axle (60), away from the first end region (76), having the smaller diameter, of the second supporting body (64), out of the interior (70) of the metal cylinder (28).

8. The method for producing a housing (12) for a throttle valve (10) as claimed in claim 7, wherein the second supporting body (68) is shaped approximately in the form of a cone.

* * * * *